Patented June 16, 1931

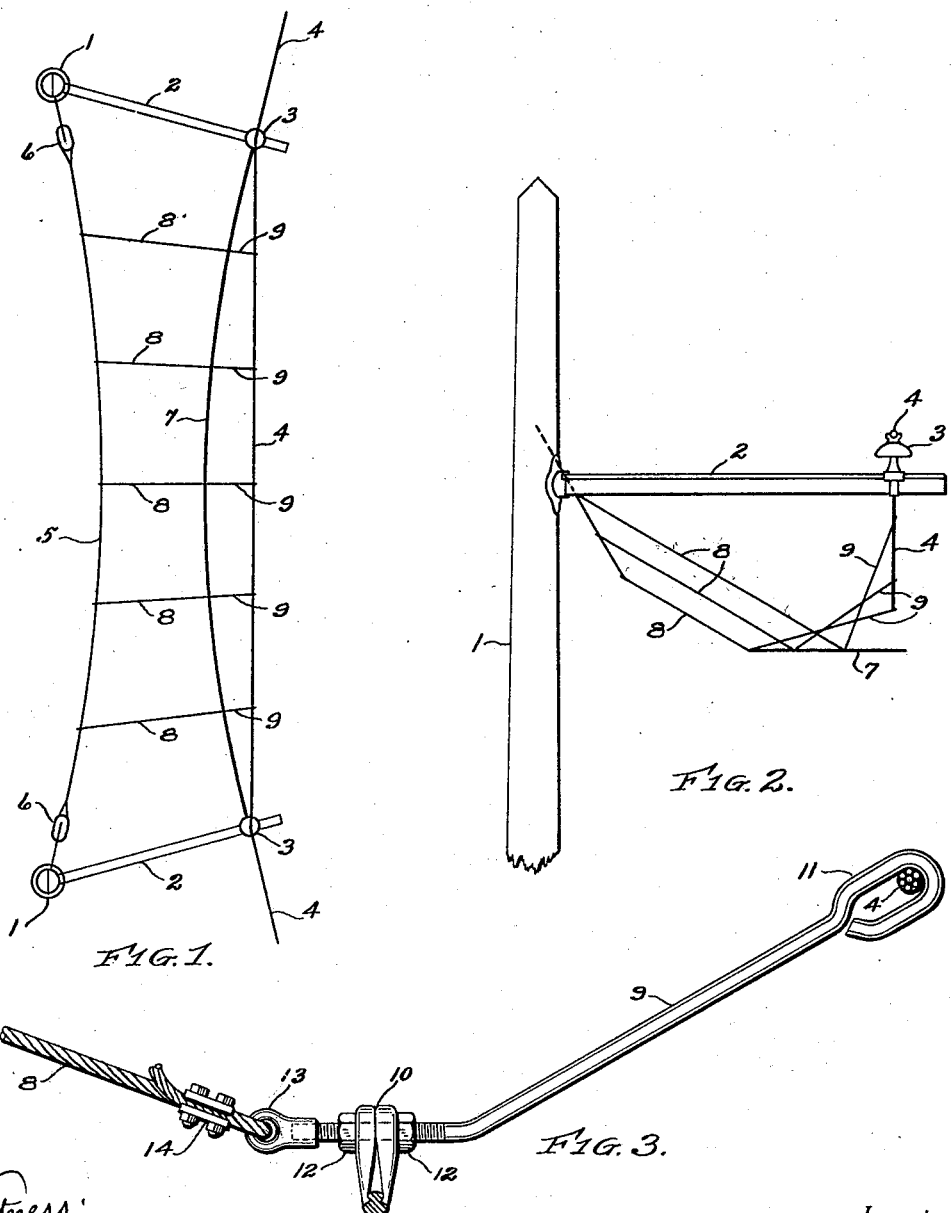

1,810,515

UNITED STATES PATENT OFFICE

LELAND W. BIRCH, OF MANSFIELD, OHIO, ASSIGNOR TO THE OHIO BRASS COMPANY, OF MANSFIELD, OHIO, A CORPORATION OF NEW JERSEY

TROLLEY SYSTEM

Application filed November 14, 1929. Serial No. 407,141.

My invention relates to electric systems and particularly to the supporting of the overhead conductor used as a source of current supply for electrically operated vehicles.

The object of my invention which relates particularly to the overhead construction upon curves is to provide a very simple arrangement for maintaining the trolley wire in a curved and horizontal plane where desired.

In the present overhead constructions on curves and where the trolley wire is suspended from the messenger cable, it is very common practice to use pull-overs and draw and maintain both the trolley wire and the messenger cable in vertical alinement on the curve so that the trolley wire is supported throughout the curve from the messenger cable by means of vertically disposed hangers.

In my improved construction I avoid pulling the messenger cable into alinement with the trolley wire and merely pull the trolley wire into the desired curvature which is usually that of the track. At the same time the trolley wire will have the vertical sag removed therefrom and will rest in a substantially horizontal plane, that is, all points of the trolley wire on the curve will be a substantially equal distance above the track. Further, I relieve the messenger wire of practically all side thrust allowing the messenger cable to assume its natural position between its points of support, thus the messenger cable will rest in a substantially vertical plane and assuming its natural sag.

My invention is fully described in this specification and shown in the drawings accompanying the specification.

In the drawings:—

Fig. 1 is a top plan view of my improved construction.

Fig. 2 is a schematic end view in elevation of Fig. 1.

Fig. 3 is a pull-off arrangement which I employ to maintain the trolley wire in its predetermined position.

In the preferred embodiment of my invention I employ two supports 1, which may be poles, towers, etc., and spaced apart. The poles 1 are provided with projecting arms 2 upon the ends of which are mounted insulators 3 supporting a messenger cable 4 which is shown as assuming a straight line between the insulators 3 in Fig. 1 and is shown as a vertical line in Fig. 2 thus showing the cable 4 as suspended in a substantially vertical plane.

Connected to the poles 1 is a back-bone cable 5 insulated therefrom by the members 6.

Suspended below the arm 2 is a trolley wire 7 shown in Fig. 1 as assuming a curve corresponding to that of the track and in Fig. 2 as positioned in a horizontal plane.

The cable 5 is shown in Fig. 1 as curved toward the trolley wire 7 and in Fig. 2 as assuming a position in an obliquely disposed plane. Extending between the back-bone cable and the trolley wire are a plurality of pull-off members 8 which pull the trolley wire into the position shown in Figs. 1 and 2 and maintain the trolley wire in such position. The construction thus far explained would be quite sufficient were it not for the fact that there would be a tendency for the trolley wire to "roll" under the strain of the pull-off wires and the upward pressure of the current collector as it moved along the trolley wire. The members 8 are preferably made of flexible cable, thus making the construction light and readily yieldable and tending to reduce considerably the so called hard spots where the trolley wire is supported.

In order to prevent the rolling of the trolley wire and to steady the same and to relieve the cable 5 of some of the vertical load of the trolley wire, I connect the trolley wire to the messenger cable 4 by means of a light rigid arm 9 which has one end secured rigidly to the trolley wire by a clamp 10 and the other end looped or provided with means 11 to attach it to the messenger cable 4. The clamp end of the rod is provided with adjusting nuts 12 by means of which the clamp 10 is drawn into tight engagement with the trolley wire and the rod 9 held rigidly to the clamp 10 and there is further secured to the rod 9 an eye attachment 13 to which is secured the pull-off cables 8 and shown secured to the eye 13 by a clamp 14 which also permits adjusting the length of the wire 8.

In constructing the system thus described, one may proceed as follows—the poles and arm being erected with the insulators thereon the messenger cable is strung and also the trolley wire, which is temporarily supported underneath the messenger cable and arms 2. The back-bone cable 5 may be positioned and drawn taut if desired. The arm 9 and clamp 10 may then be secured in position which will naturally distort the relation of the trolley wire to the messenger cable. Then the cables 8 are secured to the eyes 9 and the cable 5 and their length adjusted, thus bringing a strain upon the trolley wire and cable 5 drawing the same toward each other and also raising the trolley wire. The length of the cable 8 is adjusted until the trolley wire has assumed the position desired and substantially that shown in Fig. 2 at which time it will be found that the messenger wire 4 will have assumed its normal position shown in Fig. 2 thus relieving the messenger cable of substantially all side thrust. The lengths of the arms 9 must of course, be previously determined with respect to the amount of curvature which the trolley wire must assume. There will, however, be placed upon the messenger cable a vertical load which is not great, however, and which is the result of its taking a certain proportion of the weight of the trolley wire.

It will be recognized that the arm 9 being rigidly connected to the trolley wire will prevent the so called rolling of the trolley wire and the arm 9 being pivoted as it were to the messenger wire, the trolley wire is free to rise and fall with the passage of the current collector and the pull-off wire 8 will in no wise tend to prevent free rise and fall of the trolley wire thus supporting the trolley wire so that it substantially floats. Where the messenger wire is pulled into alinement with the trolley wire or even on straight-of-way construction the trolley is supported directly underneath the messenger cable by means of rigid hangers which, if fixedly secured to the messenger cable offers a very rigid and unyielding construction and resists the free rise and fall of the trolley wire.

My invention practically reduces to a minimum the number of elements formerly used in the curved construction on catenary lines thus reducing the cost of material and the time of construction. Time of construction is also reduced due to its being unnecessary to place the catenary cable 4 in any particular alinement other than that which it naturally assumes and all that is necessary is merely to draw the trolley wire 7 into position by means of the pull-off wire 8 and properly adjust the lengths thereof and when the trolley is in its proper position the messenger wire 4 will be found assuming a vertical plane as in Fig. 2.

Also the side pull on the back-bone 5 is naturally reduced as compared to that construction in which the messenger wire is also pulled into alinement with the trolley wire by means of pull-off wires connected to the back-bone.

It will be recognized by those skilled in the art that modifications may be made to the invention disclosed herein, therefore, I wish to be limited only by my claims.

I claim:—

1. An overhead system comprising a pair of spaced upright poles, arms projecting from each pole, insulators mounted upon the arms adjacent their ends, a messenger cable suspended between the insulators and continuing therebeyond and supported by the said insulators in a catenary curve and positioned in a vertical plane, a back-bone cable extending between the poles and assuming a curved condition positioned in an oblique plane to the said vertical plane, a trolley wire positioned in a horizontal plane and curved in the direction of the poles, spaced pull-off wires extending between the trolley wire and back-bone cable and maintaining the curvature in the back-bone cable and the trolley wire and a rigid arm having one end rigidly secured to the trolley wire at the points of connection of the pull-off wires and having its other end supported by the messenger cable without bringing a sidewise thrust upon the messenger cable.

2. An overhead system comprising a pair of spaced supports, an insulator mounted on each support, a sagging messenger cable supported by the insulators and positioned in a substantially vertical plane, a back-bone cable secured between the supports at a horizontal distance from the messenger cable, a trolley wire suspended from the supports at a distance below the messenger cable and a plurality of spaced pull-off wires between the trolley wire and the back-bone cable and tensioned to pull the cable and wire towards each other until all points of the trolley wire rest substantially in a horizontal plane and the back-bone cable in an oblique plane and rigid arms having one end securely fixed to the trolley wire and the other end supported by the messenger cable without placing a side thrust upon the messenger cable.

3. An overhead curve system comprising spaced overhead supports, insulators mounted upon the supports, a messenger cable suspended by and between the supports in a substantially vertical plane, a trolley wire positioned in a horizontal plane below the messenger cable, a back-bone cable extending between and secured to the supports, spaced arms having one end removably clamped to the trolley wire and the other end supported by the messenger cable and spaced pull-off wires of different lengths between the trolley wire and the back-bone cable and tensioned to draw the trolley wire into a curved relation concave to the back-bone cable without placing a side strain upon the messenger cable.

4. An overhead curve system comprising spaced overhead supports, insulators mounted on the supports and a messenger cable suspended by and between the supports in a substantially vertical plane, a curved trolley wire positioned in a horizontal plane below the messenger cable and means to draw the trolley wire into a curved condition and within a horizontal plane.

5. An overhead curve system comprising spaced overhead supports, insulators mounted on the supports and a messenger cable suspended by and between the supports in a substantially vertical plane, a curved trolley wire positioned in a horizontal plane below the messenger cable, pull-off means to draw the trolley wire into a curved condition within said horizontal plane and a steady arm having one end secured to the trolley wire adjacent the pull-off means and the other end loosely supported by the messenger cable to steady the trolley.

6. An overhead curve structure for electric railways comprising supporting structures, a messenger cable supported thereby, a curved trolley wire positioned in a horizontal plane, a back-bone cable secured to the supporting structures and a plurality of spaced means to suspend the trolley wire from the back-bone and messenger without side stress upon the messenger cable and each comprising a clamp to grip the trolley, a rod projecting therefrom and having at its free end means to engage the messenger cable also flexible means secured to the clamp and connected to the back-bone and its length so adjusted that the trolley wire is drawn into and held in the aforesaid horizontal plane and the messenger cable free from side strain.

7. A pull-off hanger for curved trolley wires comprising a two-part clamp to grip the trolley wire, a rod having one end projecting through and secured to the clamp and the other end having means to receive a messenger cable, means attached to the projecting end of the rod, a flexible cable having one end secured to the last means and the other end arranged to be secured to a back-bone cable and means to adjust the length of the flexible cable at the clamp.

8. A pull-off hanger for curved trolley wires comprising a two-part clamp to grip the trolley wire, a rod having one end passing through the clamp and means on said end to receive a cable and the other end having means to receive a messenger cable, and adjustable means on the rod to engage the clamp to adjust its position on the rod and cause it to grip the trolley wire.

9. A pull-off hanger for curved trolley wires comprising a two-part clamp to grip the trolley wire, a rod having one end secured to the clamp and the other end having means to receive a messenger cable, a flexible cable having one end secured to the clamp and the other end arranged to be secured to a back-bone cable and means on the rod to move the parts of the clamp into engagement with the trolley wire.

10. A pull-off hanger for curved trolley wires comprising a two-part clamp to grip the trolley wire, a rod having one end extending through apertures in the clamp parts and the other end having means to receive a messenger cable, adjustable means on the rod end to move the clamp into engagement with the wire and means on the clamp end of the rod to receive a pull-off member.

11. A pull-off hanger for curved trolley wires comprising a two-part clamp to grip the trolley wire, a rod having one end extending through apertures in the clamp parts and the other end having means to receive a messenger cable, adjustable means on the rod end to move the clamp into engagement with the wire, attaching means on the clamp end of the rod and a flexible pull-off member secured to the attaching means.

12. A pull-off hanger for trolley wires comprising a two-part clamp to grip the wire and having registering openings, a rod having a bent end positioned in the openings, means on the rod end to move the clamp parts into gripping engagement with the wire and the clamp into rigid relation to the rod, means at the opposite end of the rod to engage a messenger cable, attaching means to one of the aforesaid parts and a pull-off member secured to the attaching means.

In testimony whereof I affix my signature.

LELAND W. BIRCH.